US008417555B2

(12) United States Patent
Bagheri et al.

(10) Patent No.: US 8,417,555 B2
(45) Date of Patent: Apr. 9, 2013

(54) COLLABORATION BASED CAPACITY PLANNING IN A MODULAR BUSINESS SETTING

(75) Inventors: Saeed Bagheri, Croton On Hudson, NY (US); Jarir K. Chaar, Tarrytown, NY (US); Krishna C. Ratakonda, Yorktown Heights, NY (US); Nianjun Zhou, Danbury, CT (US)

(73) Assignee: International Business Machines Corporation, Armonk, NY (US)

( * ) Notice: Subject to any disclaimer, the term of this patent is extended or adjusted under 35 U.S.C. 154(b) by 308 days.

(21) Appl. No.: 12/782,312

(22) Filed: May 18, 2010

(65) Prior Publication Data

US 2011/0288902 A1 Nov. 24, 2011

(51) Int. Cl.
*G06Q 10/00* (2012.01)
(52) U.S. Cl. ............. 705/7.22; 705/7.14; 705/7.15; 705/7.23; 705/7.25
(58) Field of Classification Search ......... 705/7.11–7.42
See application file for complete search history.

(56) References Cited

U.S. PATENT DOCUMENTS

| | | | |
|---|---|---|---|
| 5,487,144 A | 1/1996 | Takahashi et al. | |
| 5,913,201 A * | 6/1999 | Kocur | 705/7.17 |
| 6,275,812 B1 * | 8/2001 | Haq et al. | 705/7.14 |
| 7,305,392 B1 * | 12/2007 | Abrams et al. | 707/770 |
| 2002/0029161 A1 * | 3/2002 | Brodersen et al. | 705/9 |
| 2004/0162748 A1 * | 8/2004 | Vogel et al. | 705/8 |
| 2007/0174101 A1 | 7/2007 | Li et al. | |

OTHER PUBLICATIONS

S. Halfin et al, "Heavy-Traffic Limits for Queues With Many Exponential Servers," Operations Research Society of America, vol. 29, No. 3, pp. 567-588, May-Jun. 1981.
N. Gans et al., "Telephone Call Centers: Tutorial, Review, and Research Prospects," Manufacturing and Service Operations Management 5, pp. 79-141, 2003.
L. Brown et al., "Statistical Analysis of a Telephone Call Center: A Queueing-Science Perspective," Journal of the American Statistical Association, vol. 100, No. 469, pp. 36-50, Mar. 2005.
S. Bhulai et al., "Simple Methods for Shift Scheduling in Multi-Skill Call Centers," Manufacturing and Service Operations Management 10, pp. 411-420, 2008.
M. Cezik et al., "Staffing Multiskill Call Centers Via Linear Programming and Simulation", Management Science, vol. 54, Issue 2, pp. 310-323, Feb. 2008.
IBM, "IBM ILOG Optimization and Analytical Decision Support Solutions," http://www-01.ibm.com/software/websphere/products/optimization/ , pp. 1-3.
M. Pinedo, "Scheduling: Theory, Algorithms, and Systems", Prentice Hall, NJ, 2002. Emphasis on pp. 179-197, 357-366, 427-450.

(Continued)

*Primary Examiner* — David Rines
(74) *Attorney, Agent, or Firm* — John R. Pivnichny; Law Office of Jim Boice (57) ABSTRACT

A computer implemented method, system, and/or computer program product collaboratively reallocate resources across business modules. A collaboration vector, which describes primary and second abilities for each of multiple resources, is defined. A decision matrix is created from multiple collaboration vectors, and a pipeline for transferring the multiple resources among multiple business modules is defined based on the decision matrix. A recurring time interval to measure an effectiveness of the multiple business modules is defined, and the multiple resources are reallocated according to a measured effectiveness of the multiple business modules. The collaborative matrix is optimized to reflect reallocation of the multiple resources.

17 Claims, 4 Drawing Sheets

OTHER PUBLICATIONS

Avramidis, et al., "Staffing Multi-Skill Call Centers Via Search Methods and a Performance Approximation," IIE Transactions (2009), 41, (6), pp. 1-32.

A. N. Avramidis et al., "Optimizing Daily Agent Scheduling in a Multiskill Call Center", European Journal of Operational Research 200, pp. 822-832, 2010.

* cited by examiner

$$x^*(t) = \underset{\pi_k(x(t), C_j, I(t-1)) \geq 0}{\arg\min} f(x(0), x(t-1))$$

COLLABORATION BASED CAPACITY PLANNING IN A MODULAR BUSINESS SETTING

BACKGROUND

The present disclosure relates to the field of computers, and specifically to the use of computers in allocating resources. Still more particularly, the present disclosure relates to the use of computers to allocate resources across business module boundaries.

BRIEF SUMMARY

A computer implemented method, system, and/or computer program product collaboratively reallocate resources across business modules. A collaboration vector, which describes primary and second abilities for each of multiple resources, is defined. A decision matrix is created from multiple collaboration vectors, and a pipeline for transferring the multiple resources among multiple business modules is defined based on the decision matrix. A recurring time interval to measure an effectiveness of the multiple business modules is defined, and the multiple resources are reallocated according to a measured effectiveness of the multiple business modules. The collaborative matrix is optimized to reflect reallocation of the multiple resources.

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit", "module" or "system". Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including, but not limited to, wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
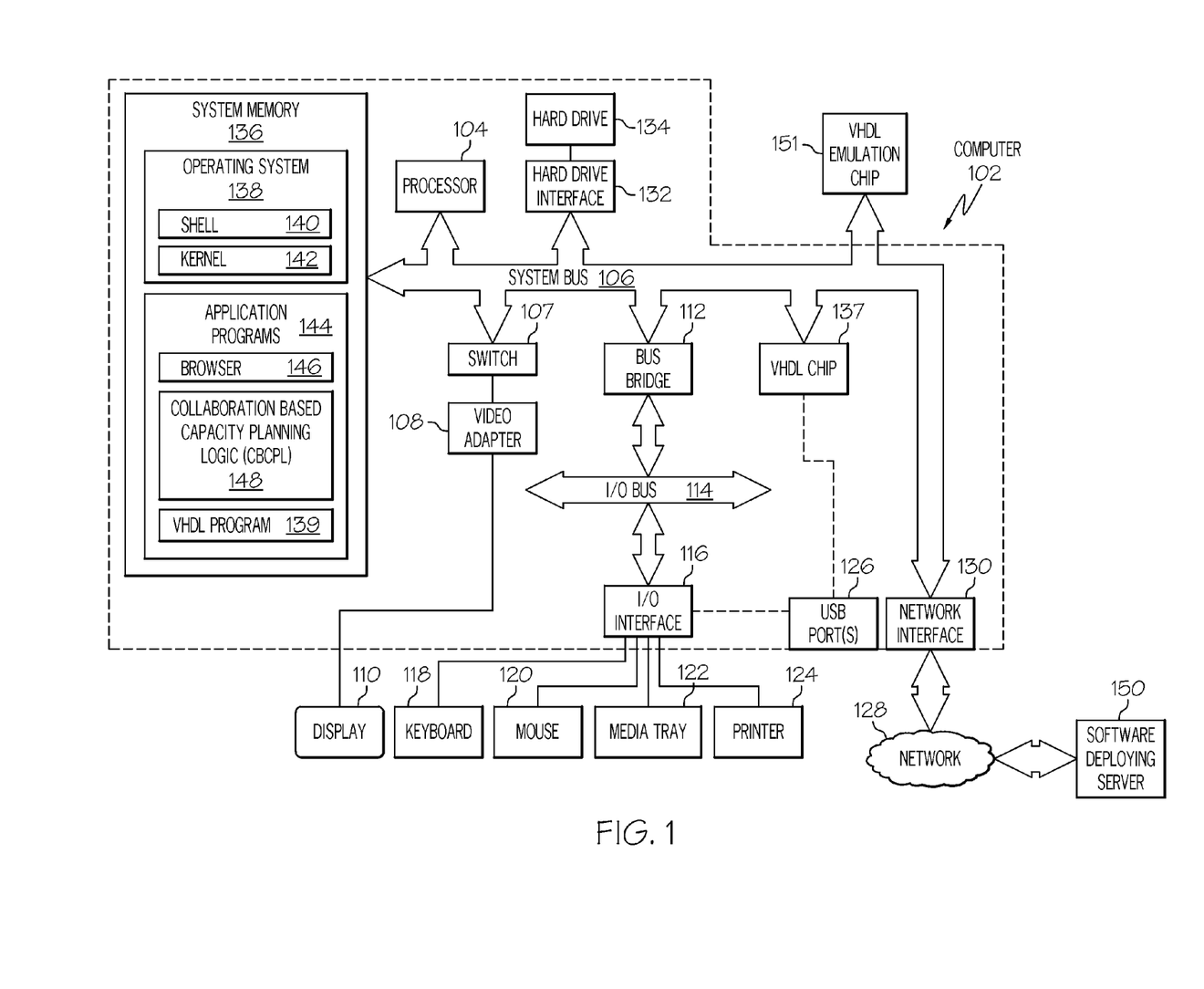
FIG. 1 depicts an exemplary computer in which the present disclosure may be implemented.

With reference now to the figures, and in particular to FIG. 1, there is depicted a block diagram of an exemplary computer 102, which may be utilized by the present invention. Note that some or all of the exemplary architecture, including both depicted hardware and software, shown for and within computer 102 may be utilized by software deploying server 150.

Computer 102 includes a processor 104 that is coupled to a system bus 106. Processor 104 may utilize one or more processors, each of which has one or more processor cores. A video adapter 108, which drives/supports a display 110, is also coupled to system bus 106. In one embodiment, a switch 107 couples the video adapter 108 to the system bus 106. Alternatively, the switch 107 may couple the video adapter 108 to the display 110. In either embodiment, the switch 107 is a switch, preferably mechanical, that allows the display 110 to be coupled to the system bus 106, and thus to be functional only upon execution of instructions (e.g., collaboration based capacity planning logic—CBCPL 148 described below) that support the processes described herein.

System bus 106 is coupled via a bus bridge 112 to an input/output (I/O) bus 114. An I/O interface 116 is coupled to I/O bus 114. I/O interface 116 affords communication with various I/O devices, including a keyboard 118, a mouse 120, a media tray 122 (which may include storage devices such as CD-ROM drives, multi-media interfaces, etc.), a printer 124, and (if a VHDL chip 137 is not utilized in a manner described below), external USB port(s) 126. While the format of the ports connected to I/O interface 116 may be any known to those skilled in the art of computer architecture, in a preferred embodiment some or all of these ports are universal serial bus (USB) ports.

As depicted, computer 102 is able to communicate with a software deploying server 150 using a network interface 130. Network 128 may be an external network such as the Internet, or an internal network such as an Ethernet or a virtual private network (VPN).

A hard drive interface 132 is also coupled to system bus 106. Hard drive interface 132 interfaces with a hard drive 134. In a preferred embodiment, hard drive 134 populates a system memory 136, which is also coupled to system bus 106. System memory is defined as a lowest level of volatile memory in computer 102. This volatile memory includes additional higher levels of volatile memory (not shown), including, but not limited to, cache memory, registers and buffers. Data that populates system memory 136 includes computer 102's operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present invention will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a renderer, shown in exemplary manner as a browser 146. Browser 146 includes program modules and instructions enabling a world wide web (WWW) client (i.e., computer 102) to send and receive network messages to the Internet using hypertext transfer protocol (HTTP) messaging, thus enabling communication with software deploying server 150 and other described computer systems.

Application programs 144 in computer 102's system memory (as well as software deploying server 150's system memory) also include a cross-platform advertisement optimization and analytic program (CBCPL) 148. CBCPL 148 includes code for implementing the processes described below, including those described in FIGS. 2-4. In one embodiment, computer 102 is able to download CBCPL 148 from software deploying server 150, including in an on-demand basis, wherein the code in CBCPL 148 is not downloaded until needed for execution to define and/or implement the improved enterprise architecture described herein. Note further that, in one embodiment of the present invention, software deploying server 150 performs all of the functions associated with the present invention (including execution of CBCPL 148), thus freeing computer 102 from having to use its own internal computing resources to execute CBCPL 148.

Also stored in system memory 136 is a VHDL (VHSIC hardware description language) program 139. VHDL is an exemplary design-entry language for field programmable gate arrays (FPGAs), application specific integrated circuits (ASICs), and other similar electronic devices. In one embodiment, execution of instructions from CBCPL 148 causes VHDL program 139 to configure VHDL chip 137, which may be an FPGA, ASIC, etc.

In another embodiment of the present invention, execution of instructions from CBCPL 148 results in a utilization of VHDL program 139 to program a VHDL emulation chip 151. VHDL emulation chip 151 may incorporate a similar architecture as described above for VHDL chip 137. Once CBCPL 148 and VHDL program 139 program VHDL emulation chip 151, VHDL emulation chip 151 performs, as hardware, some or all functions described by one or more executions of some or all of the instructions found in CBCPL 148. That is, the VHDL emulation chip 151 is a hardware emulation of some or all of the software instructions found in CBCPL 148. In one embodiment, VHDL emulation chip 151 is a programmable read only memory (PROM) that, once burned in accordance with instructions from CBCPL 148 and VHDL program 139, is permanently transformed into a new circuitry that performs the functions needed to perform the process described below in FIGS. 2-4.

The hardware elements depicted in computer 102 are not intended to be exhaustive, but rather are representative to highlight essential components required by the present invention. For instance, computer 102 may include alternate memory storage devices such as magnetic cassettes, digital versatile disks (DVDs), Bernoulli cartridges, and the like. These and other variations are intended to be within the spirit and scope of the present invention.

Figure 2:
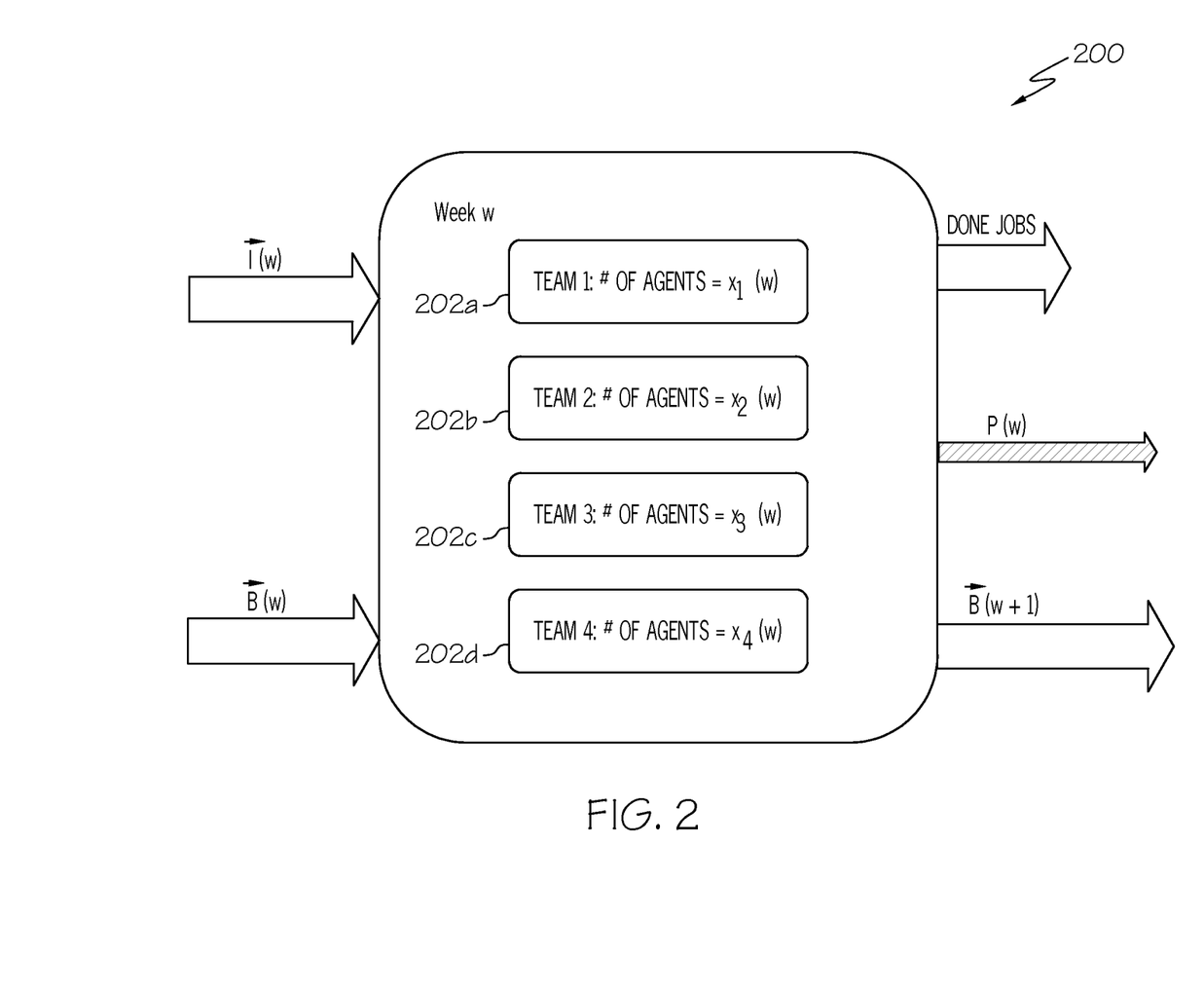
FIG. 2 illustrates a capacity planning model.

Referring now to FIG. 2, a weekly capacity planning model 200 is presented. As depicted, besides the vector of "done jobs" that have been completed by business modules 202a-d during a current week W, there are:

Vector I(w) represents new incoming work for the week;

Vector B(w) represents the backlog of unfinished work from the previous week(s);

Scalar P(w) represents any penalty paid per terms of a service level agreement for late/unfinished work; and Vector B(w+1) represents unfinished work to be carried over to the next week.

Each of the business modules 202a-d (depicted as four modules, but in practice can be any finite number of modules) utilizes multiple resources to perform particular tasks. In the example shown, assume that the task is to write software, and that each of the business modules 202a-d (Teams 1-4) is made up of programmers that specialize in a particular language (e.g., HTML, C++, ASSEMBLER, FORTRAN). While each business module can be made up of programmers who specialize in different languages, assume for explanatory purposes that each of the business modules 202a-d is made up of programmers who each have primary expertise (ability) in a same language. Thus, Team 1 is made up of HTML programmers, Team 2 is made up of C++ programmers, Team 3 is made up of ASSEMBLER programmers, and Team 4 is made up of FORTRAN programmers. If the makeup of Teams 1-4 is static, then there is no adjustment to what type of work is coming in (Vector I(w) and Vector B(w)) for the current week. If most or all of the work is for HTML programming, then Teams 2-4 would remain idle for the week. Thus, collaboration vectors are defined for each of the teams (resources used in the business modules 202a-d).

A collaboration vector defines and quantifies a primary ability and a secondary ability of each resource (e.g., each programmer in Teams 1-4). For example, assume that one of the programmers in Team 2 is an expert (has a primary ability) in C++ and has given a rating of 10, on a scale of 1-10, as a C++ programmer However, that same programmer has demonstrated by past performance, education, certification, etc. that she has only a working knowledge (has a secondary ability) of programming in HTML, and thus has been given a rating of 6 (out of 10). Thus, the collaboration vector for that programmer includes a 10 for C++ and a 6 for HTML abilities. In addition, the collaboration vector for that programmer can include other subjective, yet quantified, factors, such as her stated preference to work with other teams or to stay within her own Team 2 (her "home business module"); her number of available hours to work within a particular time period (e.g., what day of the week is she available to work?); any conflicts of interest in working with another team (i.e., are there any trade secrets that would be inappropriately divulged if she worked for another team), etc.

After collaboration vectors are created for the agents working on Teams 1-4, a decision matrix is created from these collaboration vectors. Thus, not only are the abilities/preferences of each of the agent quantified within a vector, but interactions between vectors are also quantified to describe and identify which agent is best suited to work on another team. A pipeline is created to transfer programmers between/among different teams (business modules) based on the decision matrix. That is, once the decision matrix identifies a best candidate to work on another team for that time period (e.g., during week W), then a pipeline to integrate that candidate into the other team is established, including transferring payroll and billing information for that worker, etc. Of course, the second team (business module) initially has a different set of workers than the first team; otherwise, there is no need to move workers around.

The workers then remain in their new teams for the week. At the end of that week (or any other defined recurring time interval), the effectiveness (i.e., are the "done jobs" maximized and the penalties scalar P(w) and backlog vector B(w+1) minimized) of all of the business modules 202a-d are measured. Based on the measured effectiveness, the resources are reallocated, and the collaborative matrix is optimized.

While the example of FIG. 2 showed software programmers as the resources within each of the business modules, in other embodiments the resources can be any human resource (worker), or the resources can be software, hardware, machinery, raw materials, etc. That is, each business module 202a-d could be a combination of human personnel, software, hardware, machinery, raw materials, etc. For example, assume that business module 202a and business module 202b are made up of computed numerically controlled (CNC) manufacturing machines, and that the CNC machines within business module 202a have a tolerance (level of precision) of 5 mm, while the CNC machines within business module 202b have a tolerance of 2 mm. Assume further that work coming in (I(w) and B(w)) is for the production of products having 5 mm tolerances. Although it would be a misuse of the CNC machines within business module 202b to work on these products, if there is no 2 mm work available, then it might be worthwhile to use the CNC machines within business module 202b to work on the 5 mm work, depending on the decision matrix (i.e., is it cost prohibitive to use the 2 mm CNC machines?; is there other 3 mm or 4 mm work available?, etc.).

Figure 3:
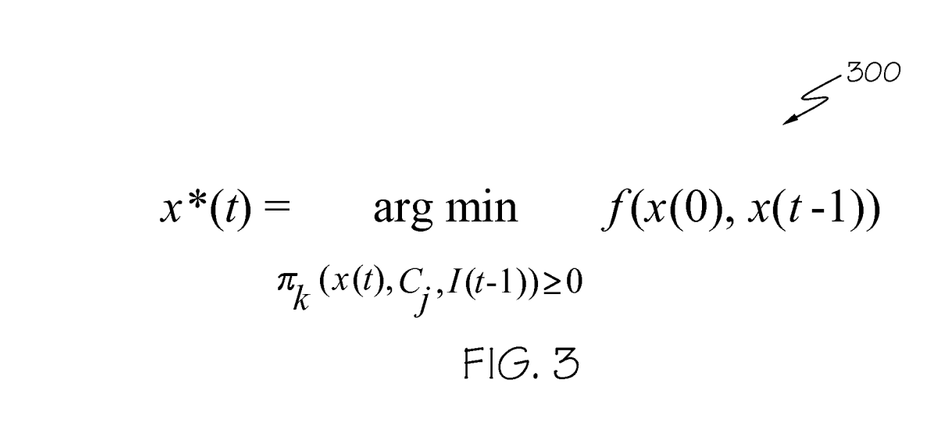
FIG. 3 depicts an algorithm utilized in one embodiment of the present disclosure to formulate an optimal reallocation of resources.

The scheduling/staffing problem described above can be formulated, thus permitting a computer to iteratively determine an optimal decision matrix and pipeline for resources. An exemplary algorithm is shown in FIG. 3 as formula 300, which is used to formulate an optimal reallocation of resources. In formula 300, $x^*(t)$ is a decision vector for finding a minimal argument used to schedule resources within business modules. The constraints of the formula 300 include scheduling restraints $\pi_k$, which defines which resources are available for use. Restraint $C_j$ is the decision matrix, which includes information regarding pending work items, workers' skills, machinery capability, etc. Restraint I holds the backlog information. Based on these constraints, the minimum argument for f (which defines how resources are reallocated among business modules x(0) through x(t−1)) is derived. This derivation leads to decision pathways, which are further modified using branch and bound algorithms, closed form initial feasible solution insertions, and heuristic limited linearization approximations.

The branch and bound algorithms set boundaries for possible pathways (branches) on the decision pathway, followed by setting upper and lower boundaries (bounding) for these branches. This boundary setting can be performed by assigning relative importance levels to each branch. For example, assume that one branch is dependent on what time of the day that a resource is available for reallocation, while another branch is dependent on what date the resource is available for reallocation. A flag can be set showing that the time of day is relatively insignificant, while the date is more significant. Thus, the bounds for the time of day are "loose", while the bounds for the date are "tight". These bounds thus control how an optimal pathway is determined. This optimal pathway is then used to define the decision matrix and the pipelines used therein.

Closed form initial feasible solution insertions are initial settings for the collaboration vectors, and are based on known (historical) features of the resources, based on past performance, reviews, etc. These initial feasible solution insertions are then heuristically modified using linearization approximations, which "smooth out" the initial assumptions based on optimized data, work performance, etc.

Figure 4:
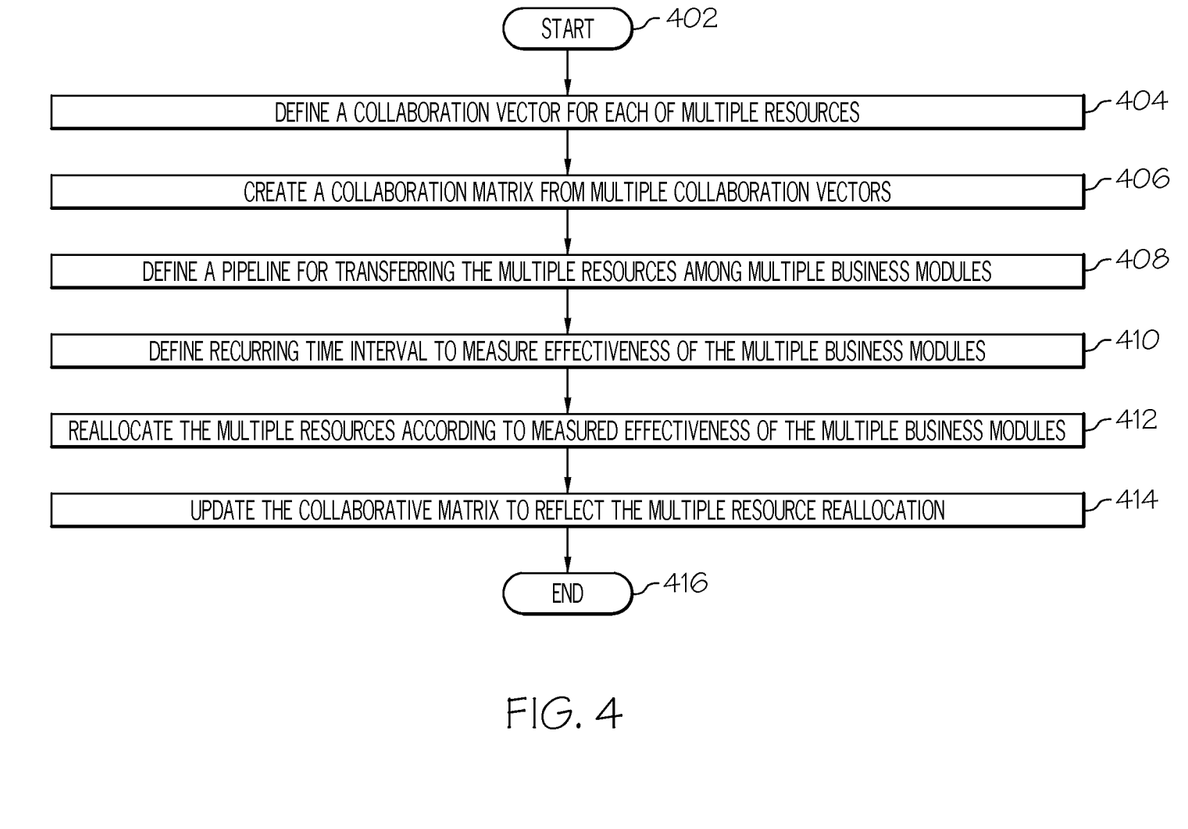
FIG. 4 is a high level flow chart of one or more exemplary steps taken by a processor to collaboratively reallocate resources across business modules.

With reference now to FIG. 4, a high level flow chart of one or more exemplary steps taken by a processor to collaboratively reallocate resources across business modules is presented. After initiator block 402, a collaboration vector is defined for each of multiple resources (block 404). The collaboration vector comprises a quantification of a primary ability and a secondary ability for each of the multiple resources. As described above, a primary ability reflects one level of expertise, output, ability, capacity, capability, etc. in one area (such as programming in a first language), which the secondary ability reflects another level of expertise in another area (such as programming in a second language). As described in block 406, a decision matrix is then created, by a processor in one embodiment, from multiple collaboration vectors. This decision matrix defines the interaction between the collaboration vectors, as described herein.

As described in block 408, a pipeline for transferring the multiple resources among multiple business modules is then defined. The pipeline is based on the decision matrix, since the decision matrix defines, using algorithms described herein, optimal reallocation of resources among the different business modules. Note that, as described herein, a first business module utilizes a different set of resources from the multiple resources than a second business module utilizes. In order to establish temporal order to the process, a recurring time interval (e.g., a week) is defined (block 410). It is during this recurring time interval that the effectiveness of the multiple business modules is measured. The effectiveness can be based on multiple parameters, including, but not limited to, the number of jobs completed by a business module during the recurring time interval, any penalty paid for failing to meet terms of a service level agreement, and the number of jobs being carried over to be completed during a next iteration of the recurring time interval (e.g., the following week). Based on these measurements, the multiple resources are reallocated according to the measured effectiveness of the multiple business modules (block 412). Upon this reallocation, the collaborative matrix is optimized, requisitely by a processor due to the complexity of the problem, to reflect the reallocating of the multiple resources (block 414). This results in an optimal resource allocation matrix, and the process end (terminator block 416).

In one embodiment, the process represented in block 412 involves a novel problem formulation and solution algorithm, described below.

Problem Formulation

In order to establish a problem that describes an exemplary resource allocation (e.g., staffing) issue, let n, m and l be n) numbers of business modules involved, m) different work types that may be requested (or delivered) during a task and l) different agent types that may be available to business modules, respectively. For explanatory purposes, assume that collaboration based staffing occurs every T time unit. In other words, once the assignment of agents (which can be machinery, personnel, or any other resource) to business module I ($1 \leq i \leq n$) is done through staffing at time t, the assignment is valid until time t+T, when staffing is due for renewal. For each task j, let its 7-tuple be $\Omega_j = \{d_j, r_j, s_j, q_j, w_j, \rho_j, \pi_j\}$, where $d_j, r_j, s_j, q_j, w_j, \rho_j$ and $\pi_j$ represent due date, release time, start time (which in general is greater than or equal to the release time), processing time, work type, owning module and tardiness penalty, respectively. Here, $r_j, s_j, q_j \in \{1, 2 \ldots T\}$, $d_j \in \mathbb{N}$, $w_j \in \{1, 2 \ldots m\}$, $\rho_j \in \{1, 2 \ldots n\}$ and finally $\pi_j \in \mathbb{R}$. For each agent type k, let $\rho_k$ and $b_k$ represent owning module and salary per one unit of time. Here, $\rho_k \in \{1, 2 \ldots n\}$ and $b_k \in \mathbb{R}$. Also, let σ be an l×m matrix, where $\sigma_{k\mu} \in \{0,1\}$ states whether an agent with type k ($1 \leq k \leq l$) can perform a work type μ ($1 \leq \mu \leq m$) or not.

Let $x(t) \in \mathbb{N}^{n \times l}$ be the staffing matrix at time t where, $x_{ik}(t)$ represents the number of agents with type k ($1 \leq k \leq l$) that are assigned to business module i ($1 \leq i \leq n$) at time t. The objective is to find $x_{ik}(t_0+T)$, $x_{ik}(t_0+2T)$, $x_{ik}(t_0+3T)$ etc. Assume the task arrival to follow a uniform probability distribution function (PDF) with known properties for each module and each work type. Consequently, state of the art methods can be used to find the optimum value for $x_{ik}(t_0)$ [8-10]. This results in Equation (1):

$$x_{ik}(t_0) = 0 \; \forall (i,k): \rho_k \neq i \qquad \text{Equation (1)}$$

Now, let $N_k = \sum_{i=1}^{n} x_{ik}(t_0)$ be the number of agents with type k ($1 \leq k \leq l$) hired into the modular business at time $t_0$. It follows from Equation (1) that $N_k = x_{\rho_k k}(t_0)$ assuming that $N_k$ for all k remains constant through time.

Since each of the available agents belongs to a business module, it is expected that their skill set is close to the skills necessary to do the tasks in their corresponding module. In normal operation (i.e., job arrival follows the PDF exactly), it is expected that agents work in their own business modules; however, in extreme cases where one module is facing significantly higher than normal task arrival rate, it is natural to expect other modules to help the extremely busy module. To facilitate the formulation of this activity, an n×l so-called decision matrix C is defined, where $C_{ik} \in [0,1]$ represents the relative processing time of a task originally for module i when done by an agent whose home business module is $\rho_k$.

Let $S(t) = \{j | t \leq r_j < t+T\}$ be the set of indices of all tasks arriving to the business between time t and t+T that need to be delivered within the same time period. Also, let $B(t) = \{j \in S(t_0, t) | s_j + q_j > t\}$ be the set of indices of tasks backlogged, i.e. tasks that have arrived at the business before time t and are yet to complete (or even start).

Equation (2) below describes a staffing matrix x that meets various constraints, including that of decision matrix C.

$$x^*(T) = \operatorname{argmin} \sum_{j \in J} \pi_j \max(s_j + q_j - r_j - d_j, 0) \qquad \text{Equation (2)}$$

$$\sum_{j \in J_{i\mu}} \phi_{j\tau} \leq \sum_{k=1}^{l} \delta_{ik\mu\tau} \sigma_{k\mu} C_{ik}$$

$$\forall \; 1 \leq i \leq n, \; 1 \leq \mu \leq m, \; 1 \leq \tau \leq T$$

$$\sum_{\mu=1}^{m} \delta_{ik\mu\tau} = \sum_{\mu=1}^{m} \delta_{ik\mu 1}$$

$$\forall \; 1 \leq i \leq n, \; 1 \leq k \leq l, \; 1 \leq \tau \leq T$$

$$\sum_{i=1}^{n} \sum_{\mu=1}^{m} \delta_{ik\mu 1} = x_{\rho_k k}(1)$$

$$\forall \; 1 \leq k \leq l$$

$$\sum_{\tau=1}^{T} \phi_{j\tau} \leq q_j$$

$$\forall \; j \in J$$

$$s_j = \operatorname*{argmin}_{\tau}(T+1)(1 - \phi_{j\tau}) + \tau \phi_{j\tau} - \tau/(T+1)$$

$$\forall \; j \in J$$

$$\phi_{j\tau} \geq 1$$

$$\forall \; s_j \leq \tau \leq \min(s_j + q_j, T), \; j \in J$$

-continued $$\phi_{j\tau} \leq 0$$

$$\forall \tau < r_j, j \in J$$

$$x_{ik}(T) = \sum_{\mu=1}^{m} \delta_{ik\mu 1}$$

$$\forall 1 \leq i \leq n, 1 \leq k \leq l$$

where $J=E[B(t_0+MT)]|B(t_0+MT)$, with $M=\|J\|$, $J_{i\mu}=\{j\in J|\rho_j=i, w_j=\mu,\}$ and $\phi$ is an M×T matrix where $\phi_{j\tau}\in\{0, 1\}$ states whether task j is being worked on by some resource at time $\tau$ or not. Note that without loss of generality and for simplicity only, labels for time intervals have been changed from $[t_0+MT, t_0+MT+1 \ldots t_0+MT+T-1]$ to $[1, 2 \ldots T]$ in Equation (2). Finally $\delta$ is an n×l×m×T four-dimensional array, where $\delta_{ik\mu\tau}\in\mathbb{N}$ represents the number of agents with type k ($1\leq k\leq l$) who are currently in business module i ($1\leq i\leq n$) and are performing a work type $\mu$ ($1\leq\mu\leq m$) at time $\tau$ ($1\leq\tau\leq T$). Moreover, here it is assumed that each agent works on a given task at a given time alone. To allow multiple agents working on the same task simultaneously is a straightforward extension of Equation (2) which is skipped for simplicity.

Equation (2) is the general form of the problem formulation. The solution to this equation determines the optimum distribution of resources within different business units for a given time interval of length T (e.g. a week or a month). Note that the key parameter that controls the performance of the assigned resources and mechanics of the resource distribution is the decision matrix. It is expected that $C_{ik}=1\forall(i,k): \rho_k=i$; i.e. an agent performs perfectly in his/her original module. However, as an agent moves outside his/her home module the performance is degraded (even thought the skill to perform a work-type exists) due to reasons such as less familiarity with current state of the work, culture, etc. Hence, the formula $C_{ik}\leq 1\forall(i,k): \rho_k\neq i$.

Solution Algorithm

Equation (2) is a mixed integer nonlinear programming (MINLP) problem. This problem is NP hard. For a relatively small problem (n=m=l=1, N=20 and M=50), a standard branch and bound (B&B) approach with B&B engines does not produce a feasible solution within an acceptable length of time. Even when the feasible solution is produced, the solution quality remains arbitrarily far from optimality. In order to address this issue, the following solution is presented.

First, it should be noted that the objective of Equation (2) is not scheduling, rather staffing, although a byproduct of solving this problem is the scheduling details. Another observation is that almost always the staffing decisions happen on an interval that is at least a couple of orders of magnitude larger than the average processing time of tasks in the business [i.e. $T\gg(1/M)\Sigma_{j\in J}q_j$].

Using the above two observations to approximate Equation (2) results in the formulation of Equation (3), shown below. With regard to Equation (3), it is assumed that once at each point in time only one task in a given module and work-type is being worked on. Furthermore, all the resources in that module that are working on that work-type, are working on the aforementioned task together. Although, in real life this assumption may not hold, it is shown that a staffing that is an optimal solution under this condition is also optimal close to the optimal solution of Equation (2). This relatively simple and intuitive assumption simplifies the problem under consideration by significantly reducing the feasible space. In particular, observe that the first inequality constraint in Equation (2) has turned into an equality constraint in Equation (3). Moreover, the right-hand-side of the fourth inequality has changed from an arbitrarily large value to one, which is a standard form for fast constraint holding approach in standard B&B methods.

Finally, in order to allow this formulation, let $$T^* = \max_{i,\mu}\left\{\sum_{j\in J_{i\mu}} q_j\right\}$$

be the new time period length. This value ensures that all the tasks will be able to schedule within the interval and hence a feasible solution (with respect to the first constraint) exists. Needless to say, during the actual scheduling (once the staffing is done) and as the real tasks arrive (as opposed to an assumed expected arrival) the tasks will only be scheduled during the period ending at T at which time a new staffing is due.

$$x^*(T) = \operatorname*{argmin}\sum_{j\in J}\pi_j\max(s_j + q_j - r_j - d_j, 0) \quad \text{Equation (3)}$$

$$\sum_{\tau=1}^{T^*}\phi_{j\tau}\left(\sum_{k=1}^{l}\delta_{ik\mu\tau}\sigma_{k\mu}C_{ik}\right) = q_j$$

$$\forall 1 \leq i \leq n, 1 \leq \mu \leq m, j \in J_{i\mu}$$

$$\sum_{\mu=1}^{m}\delta_{ik\mu\tau} = \sum_{\mu=1}^{m}\delta_{ik\mu 1}$$

$$\forall 1 \leq i \leq n, 1 \leq k \leq l, 1 \leq \tau \leq T^*$$

$$\sum_{i=1}^{n}\sum_{\mu=1}^{m}\delta_{ik\mu 1} = x_{\rho_k k}(1)$$

$$\forall 1 \leq k \leq l$$

$$\sum_{j\in J_{i\mu}}\phi_{j\tau} \leq 1$$

$$\forall 1 \leq i \leq n, 1 \leq \mu \leq m$$

$$s_j = \operatorname*{argmin}_{\tau}(T^* + 1)(1 - \phi_{j\tau}) + \tau\phi_{j\tau} - \tau/(T^* + 1)\forall j \in J$$

$$\phi_{j\tau} \geq 1 \,\forall s_j \leq \tau \leq \min(s_j + q_j, T^*), j \in J$$

$$\phi_{j\tau} \leq 0 \,\forall \tau < r_j, j \in J$$

$$x_{ik}(T) = \sum_{\mu=1}^{m}\delta_{ik\mu 1} \,\forall 1 \leq i \leq n, 1 \leq k \leq l$$

Since Equation (3) has a significantly smaller feasible space compared to Equation (2), it is preferable to supply the optimization engine with a feasible solution. Equation (4) below shows a closed form feasible solution for Equation (3) that can be used as a starting point for the optimum solution search.

$$x_{ik}(T) = \begin{cases} x_{ik} = x_{ik}(1), & \rho_k = i \\ x_{ik} = 0, & \rho_k \neq i \end{cases} \quad \text{Equation (4)}$$

In addition, further reducing the feasible space by adding the following constraint to Equation (3) results in Equation (5):

$$x_{\rho_k k}(T) \leq (1+\epsilon) x_{\rho_k k}(1), \forall 1 \leq k \leq l$$

$$x_{\rho_k k}(T) \geq (1-\epsilon) x_{\rho_k k}(1), \forall 1 \leq k \leq l \quad \text{Equation (5)}$$

where ε should be between 0.1 and 0.2 to allow for 10 to 20 percent collaboration. The rationale behind the constraint in Equation (5) is that the agents that are originally at a given module (their home module) are trained for tasks in that module, and thus it makes sense to keep most of them in their home module at all times. The objective of collaboration based capacity planning is, for example, to allow 10 to 20 percent movement of resources, and Equation (5) enforces just that.

In one embodiment in developing an algorithm for solving the collaboration-based capacity management, prioritization in branch exploration of B&B methods is utilized. Three classes of branches are recognized and used to adjust the optimization engine accordingly. The first class includes variables $x_{\rho_k k}$ for all k ($1 \leq k \leq l$). These variables represent the number of agents who have stayed in their own module. Since these agents have the most impact on the final productivity of the business, their assignment must be made first. The second class of branches includes variables $x_{ik}$ where i≠k for all i ($1 \leq i \leq n$) and k ($1 \leq k \leq l$). These variables represent the number of agents who have left their home module. This set, along with the first set, completely determines the staffing matrix and together constitute the greatest number of branches. The third class includes all other variables whose values are to be found during the optimization. These variables relate to scheduling specific information and as such are not relevant to staffing applications. These classes are summarized in Table 1.

TABLE 1

Different classes in branch and bound search prioritization.

| Class Number | 1 | 2 | 3 |
|---|---|---|---|
| Variables | $x_{\rho_k k} \forall k$ | $x_{ik}: i \neq \rho_k \forall i, k$ | All other variables |

Equation (3) along with constraints in Equation (5), the closed form feasible solution of Equation (4), and the B&B search prioritization of Table 1, complete the approximation of Equation (2).

Disclosed herein is a novel approach in staffing that is both module-aware and collaboration friendly. The optimization problem is formulated as a mixed integer nonlinear programming. A solution algorithm for this optimization problem is presented that is based on several key intuitive heuristic approximations, prioritization of branch selection in branch and bound method and finally a feasible (but not necessarily optimum) closed form analytic solution to be used as initial guess in the optimization.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Note further that any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the invention of the present application in detail and by reference to illustrative embodiments thereof, it will be apparent that modifications and variations are possible without departing from the scope of the invention defined in the appended claims.

What is claimed is:

1. A computer-implemented method of collaboratively reallocating resources across business modules, the computer-implemented method comprising:

defining a collaboration vector for each of multiple resources, wherein the collaboration vector comprises a quantification of a primary ability and a secondary ability for each of the multiple resources;

a processor creating a decision matrix from multiple collaboration vectors;

defining a pipeline for transferring the multiple resources among multiple business modules, wherein the pipeline is based on the decision matrix, and wherein a first business module utilizes a different set of resources from the multiple resources than a second business module;

defining a recurring time interval to measure an effectiveness of the multiple business modules;

reallocating the multiple resources according to a measured effectiveness of the multiple business modules, current status of a backlog of jobs, and a future expectation of job arrival for the multiple business modules, wherein the measured effectiveness is based on a number of jobs completed by a business module during the recurring time interval, a penalty paid for failing to meet terms of a service level agreement, a number of jobs being carried over to be completed during a next interation of the recurring time interval, and a monetary cost associated with completing a job; and the processor updating the decision matrix to reflect the reallocating of the multiple resources to create an optimal resource allocation matrix.

2. The computer-implemented method of claim 1, wherein the multiple resources are hardware resources.

3. The computer-implemented method of claim 1, wherein the multiple resources are human resources.

4. The computer-implemented method of claim 1, wherein the collaboration vector is further determined in accordance with a worker's stated preference against working within a business module that is outside a home business module for the worker.

5. The computer-implemented method of claim 1, wherein the decision matrix is optimized by the processor using a branch and bound algorithm for the pipeline.

6. The computer-implemented method of claim 1, wherein the decision matrix is optimized by the processor using a closed form feasible solution insertion for the pipeline.

7. The computer-implemented method of claim 1, wherein the decision matrix is optimized by the processor using a linear approximations heuristics for the pipeline.

8. The computer-implemented method of claim 1, wherein the optimal resource allocation matrix is determined according to a formula:

$$x^*(t) = \arg\min f(x(0), x(t-1))$$

$$\pi_k(x(t), C_g, I(t-1)) \leq 0$$

where $x^*(t)$ is a decision vector for finding a minimal argument used to schedule resources within business modules, wherein constraints of the formula include scheduling restraints $\pi_k$ that define which resources are available for use, wherein scheduling restraints $\pi_k$ are based on a restraint $C_j$ that is a decision matrix which includes information regarding pending work items, workers' skills, and machinery capability; and wherein the scheduling restraints $\pi_k$ are further based on a restraint I that holds backlog information for business modules $x(0)$ through $x(t-1)$; wherein, based on scheduling restraints $\pi_k$, a minimum argument for f, which defines how resources are reallocated among business modules $x(0)$ through $x(t-1)$, is derived; wherein each task j is defined by a 7-tuple $\Omega = \{d_j, r_j, s_j, q_j, w_j, p_j\}$, where dj represents a due date of task j, $r_j$ represents a release time of task j, $s_j$ represents a start time, which is greater than or equal to the release time, of task j, $q_j$ represents a processing time of task j, $w_j$ represents a work type of task j, $p_j$ represents an owning business module of task j, and $\pi_j$ represents a tardiness penalty of task j; and wherein resource reallocation is derived from a matrix of n x m x l, wherein n represents a number of business modules involved when performing task j, m represents different work types that are delivered during task j, and l represents different agent types that are available to the multiple business modules when performing task j.

9. The computer-implemented method of claim 1, further comprising:

limiting the reallocating of the multiple resources to a predetermined percentage of resources in the first business module.

10. A computer program product for collaboratively reallocating resources across business modules, the computer program product comprising:

a non-transitory computer readable storage medium;

first program instructions to define a collaboration vector for each of multiple resources, wherein the collaboration vector comprises a quantification of a primary ability and a secondary ability for each of the multiple resources;

second program instructions to create a decision matrix from multiple collaboration vectors;

third program instructions to define a pipeline for transferring the multiple resources among multiple business modules, wherein the pipeline is based on the decision matrix, and wherein a first business module utilizes a different set of resources from the multiple resources than a second business module;

fourth program instructions to define a recurring time interval to measure an effectiveness of the multiple business modules;

fifth program instructions to reallocate the multiple resources according to a measured effectiveness of the multiple business modules, current status of a backlog of jobs, and a future expectation of job arrival for the multiple business modules, wherein the measured effectiveness is based on a number of jobs completed by a business module during the recurring time interval, a penalty paid for failing to meet terms of a service level agreement, a number of jobs being carried over to be completed during a next iteration of the recurring time interval, and a monetary cost associated with completing a job; and sixth program instructions to update the decision matrix to reflect the reallocating of the multiple resources to create an optimal resource allocation matrix; and wherein the first, second, third, fourth, fifth and sixth program instructions are stored on the non-transitory computer readable storage medium.

11. The computer program product of claim 10, wherein the multiple resources are hardware resources.

12. The computer program product of claim 10, wherein the multiple resources are human resources.

13. The computer program product of claim 10, wherein the collaboration vector is further determined in accordance with a worker's stated preference against working within a business module that is outside a home business module for the worker.

14. The computer program product of claim 10, wherein the decision matrix is optimized by the processor using a branch and bound algorithm for the pipeline.

15. A computer system comprising:

a central processing unit (CPU), a computer readable memory, and a computer readable storage medium;

first program instructions to define a collaboration vector for each of multiple resources, wherein the collaboration vector comprises a quantification of a primary ability and a secondary ability for each of the multiple resources;

second program instructions to create a decision matrix from multiple collaboration vectors;

third program instructions to define a pipeline for transferring the multiple resources among multiple business modules, wherein the pipeline is based on the decision matrix, and wherein a first business module utilizes a different set of resources from the multiple resources than a second business module;

fourth program instructions to define a recurring time interval to measure an effectiveness of the multiple business modules;

fifth program instructions to reallocate the multiple resources according to a measured effectiveness of the multiple business modules, wherein the measured effectiveness is based on a number of jobs completed by a business module during the recurring time interval, a penalty paid for failing to meet terms of a service level agreement, a number of jobs being carried over to be completed during a next iteration of the recurring time interval, and a monetary cost associated with completing a job; and sixth program instructions to update the decision matrix to reflect the reallocating of the multiple resources to create an optimal resource allocation matrix, current status of a backlog of jobs, and a future expectation of job arrival for the multiple business modules; and wherein the first, second, third, fourth, fifth and sixth program instructions are stored on the computer readable storage medium for execution by the CPU via the computer readable memory.

16. The computer system of claim 15, wherein the multiple resources are hardware resources.

17. The computer system of claim 15, wherein the multiple resources are human resources.

\* \* \* \* \*